US012793072B2

(12) United States Patent
Siekman et al.

(10) Patent No.: US 12,793,072 B2
(45) Date of Patent: Nov. 10, 2026

(54) CRYPTOCURRENCY TRACING SYSTEM

(71) Applicant: Bank of America Corporation, Charlotte, NC (US)

(72) Inventors: James Siekman, Charlotte, NC (US); Robert Timothy Leedy, Jr., Belmont, NC (US); Aaron Buchanan, Mint Hill, NC (US); Michael Thomas Malarkey, Waxhaw, NC (US)

(73) Assignee: Bank of America Corporation, Charlotte, NC (US)

(*) Notice: Subject to any disclaimer, the term of this patent is extended or adjusted under 35 U.S.C. 154(b) by 235 days.

(21) Appl. No.: 18/516,272

(22) Filed: Nov. 21, 2023

(65) Prior Publication Data

US 2025/0165980 A1 May 22, 2025

(51) Int. Cl.
*G06Q 20/40* (2012.01)
*G06Q 20/36* (2012.01)

(52) U.S. Cl.
CPC ..... *G06Q 20/4016* (2013.01); *G06Q 20/3678* (2013.01); *G06Q 20/407* (2013.01)

(58) Field of Classification Search
CPC ........... G06Q 20/4016; G06Q 20/3678; G06Q 20/407
See application file for complete search history.

(56) References Cited

U.S. PATENT DOCUMENTS 9,367,872 B1 6/2016 Visbal et al.
11,481,761 B2 10/2022 Lam
11,546,373 B2 1/2023 Jevans et al.
11,568,416 B2 1/2023 Ludwig et al.
11,755,958 B1 9/2023 Bhattarai et al.
12,062,037 B1 * 8/2024 Coventry .............. H04L 9/0825
12,586,065 B2 * 3/2026 Suh ...................... G06Q 20/223
2016/0292672 A1 10/2016 Fay et al.
2019/0279215 A1 9/2019 Kuchar et al.
2019/0370792 A1 * 12/2019 Lam .................. G06Q 20/3678
(Continued)

OTHER PUBLICATIONS

Mcshane, Justin, "In-Depth Look at Chainalysis, Elliptic and Ciphertrace: Forensic Science in Blockchain Analysis" The Truth About Forensic Science, May 4, 2023 (Year: 2023).*
(Continued)

*Primary Examiner* — John W Hayes
(74) *Attorney, Agent, or Firm* — Banner & Witcoff, Ltd.

(57) ABSTRACT

Various aspects of the disclosure relate to automated identification of illicit transfers of cryptocurrency via mixing organizations. A cryptocurrency tracing system is configured to transfer a series of electronic transactions between known digital wallets via a suspect mixing organization. The cryptocurrency tracing system traces each cryptocurrency transaction through a plurality of mixing digital wallets to identify all possible mixing digital wallets being used by the mixing organization. Based on the identified mixing digital wallets, suspect digital wallets are identified and a second series of transactions are initiated between the known digital wallets via the mixing digital wallets. Based on these transfers, suspect digital wallets can be monitored to identify cryptocurrency transfer patterns representative of an attempt to obscure illicit funds transfers. Once identified, the suspect digital wallets may be automatically frozen.

20 Claims, 9 Drawing Sheets

500

(56) References Cited

U.S. PATENT DOCUMENTS

| | | | | |
|---|---|---|---|---|
| 2020/0202358 | A1* | 6/2020 | McClelland | G06Q 20/4016 |
| 2021/0182836 | A1 | 6/2021 | Bar Zakay | |
| 2022/0020011 | A1 | 1/2022 | Li et al. | |
| 2022/0101326 | A1* | 3/2022 | Kim | G06Q 20/4016 |
| 2022/0188802 | A1 | 6/2022 | Sells et al. | |
| 2023/0206231 | A1* | 6/2023 | Saad | G06Q 20/065 705/75 |
| 2023/0328098 | A1* | 10/2023 | Illum | H04L 67/1097 709/224 |
| 2024/0346508 | A1* | 10/2024 | Jevans | G06Q 20/4016 |

OTHER PUBLICATIONS

Li, Yannan et al, "Toward Privacy and Regulation in Blockchain-Based Cryptocurrencies", IEEE Network, Oct. 2019 (Year: 2019).*

Kucuk, Duzgun et al, "Investigation of Cryptocurrency-Centered Money Laundering Scenarios in Terms of Digital Forensics", Int. J. Adv. Eng. Pure Sci, 2023 (Year: 2023).*

Liu, Xiao Fan et al, "Characterizing Key Agents in the Cryptocurrency Economy Through Blockchain Transaction Analysis", EPJ Data Science, 2021 (Year: 2021).*

Kharif, Olga, "Crypto-Tracing Software Firm Expands to Cover More Currencies", Bloomberg.com, Apr. 2018 (Year: 2018).*

Roberts, Jeff John, "To Catch a Bitcoin Thief, Call These Detectives", Fortune.com, Jun. 2018 (Year: 2018).*

* cited by examiner

CRYPTOCURRENCY TRACING SYSTEM

BACKGROUND

Large organizations, such as financial institutions and other large enterprise organizations, may provide many different products and/or services. To support these complex and large-scale operations, a large organization may own, operate, and/or maintain many different computer systems that service different internal users and/or external users in connection with different products and services. In addition, some computer systems internal to the organization may be configured to exchange information with computer systems external to the organization so as to provide and/or support different products and services offered by the organization.

Distributed peer-to-peer systems, such as blockchains or other distributed ledger computing systems may be freely accessible, often without ownership from a single entity and may be leveraged to facilitate cryptocurrency exchange. For example, with a blockchain payments network, processing, settlement, and validation of transactions correctly facilitates a secure and immutable record of cryptocurrency transactions. Because of the open and distributed nature of such payment networks, financial organizations may have difficulty meeting requirements of certain laws and regulations such as the Bank Secrecy act to detect and report suspicious money exchange activities. Because cryptocurrency exchanges are often configured to mask ownership of participating digital wallets, cryptocurrency transactions may be considered to be untraceable due to the extreme difficulty in tracing. For example, cryptocurrency tumblers or mixers may set up a cryptocurrency exchange structure to "wash" cryptocurrency and obscure an exchange path. For example, an individual may transfer an amount (e.g., $100) to a mixer, who then divides that $100 between multiple digital wallets (e.g. 3 digital wallets). In doing so, the mixers are masking ill-gotten gains. As a result of the complexity associated with the multiple cryptocurrency exchange environments and their exchanges, it may be difficult for such an organization, such as a financial institution, to ensure transactions facilitated via these cryptocurrency exchanges meet regulatory standards.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary presents some concepts of the disclosure in a simplified form as a prelude to the description below.

Aspects of the disclosure relate to computer systems that provide effective, efficient, scalable, and convenient ways of securely and uniformly managing how internal computer systems exchange information with external computer systems to provide and/or support different products and services offered by an organization (e.g., a financial institution, and the like).

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes identification and tracing (or tracking) of electronic transactions via a cryptocurrency tracing system associated with one or more distributed ledger computing systems and/or cryptocurrency exchanges.

Various aspects of the disclosure relate to automated identification of illicit transfers of cryptocurrency via mixing organizations. A cryptocurrency tracing system is configured to transfer a series of electronic transactions between known digital wallets via a suspect mixing organization. The cryptocurrency tracing system traces each cryptocurrency transaction through a plurality of mixing digital wallets to identify all possible mixing digital wallets being used by the mixing organization. Based on the identified mixing digital wallets, suspect digital wallets are identified and a second series of transactions are initiated between the known digital wallets via the mixing digital wallets. Based on these transfers, suspect digital wallets can be monitored to identify cryptocurrency transfer patterns representative of an attempt to obscure illicit funds transfers. Once identified, the suspect digital wallets may be automatically frozen.

The cryptocurrency tracing system may send an amount of crypto coins (or other cryptocurrency) to a suspected tumbler on a periodic basis (e.g., every 5 minutes), such as via electronic transaction of a known quantity of cryptocurrency. The cryptocurrency tracing system may then monitor the distribution of the cryptocurrency, have a time-date stamp of how the tumbler was working at the time. For example, if a cryptocurrency coin sent from a first wallet and 4 different coins may be received as output in my wallet, the sent coins may have a talk-back beacon (e.g., a tracing pattern) on them enabling mapping of the coin's exit from the tumbler and into which wallets it landed in for that point in time. The system can then track where the money ended up. The final wallets are considered to be the exit nodes. Machine learning may be used to identify where the money is likely to end up, such as by using historical data of coin prices, time and date stamps, and transaction volume combined with historical information stored in a database of known malicious wallets. This concept may be analogized to adding food dye to see where the liquid ends up via 3rd party tumblers. The path taken can be reconstructed with a time and date stamp and then, when wanting to track a wallet's actual historical use of the mixer, the historical path is known to unmask to path through a series of digital wallets that the cryptocurrency amounts took from sender to receiver.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
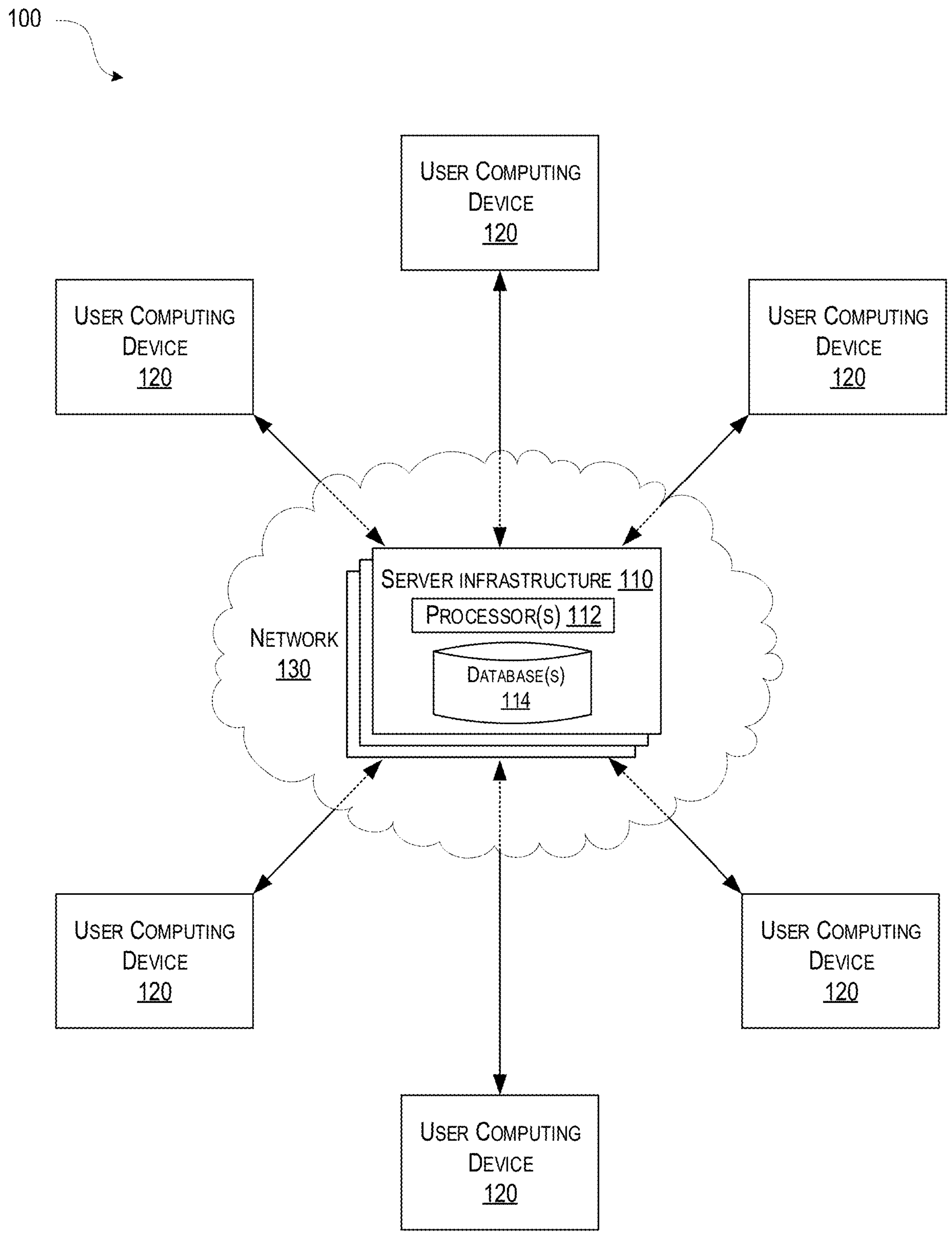
FIG. 1 shows an illustrative example of centralized computer system in accordance with one or more illustrative aspects described herein.
Figure 2:
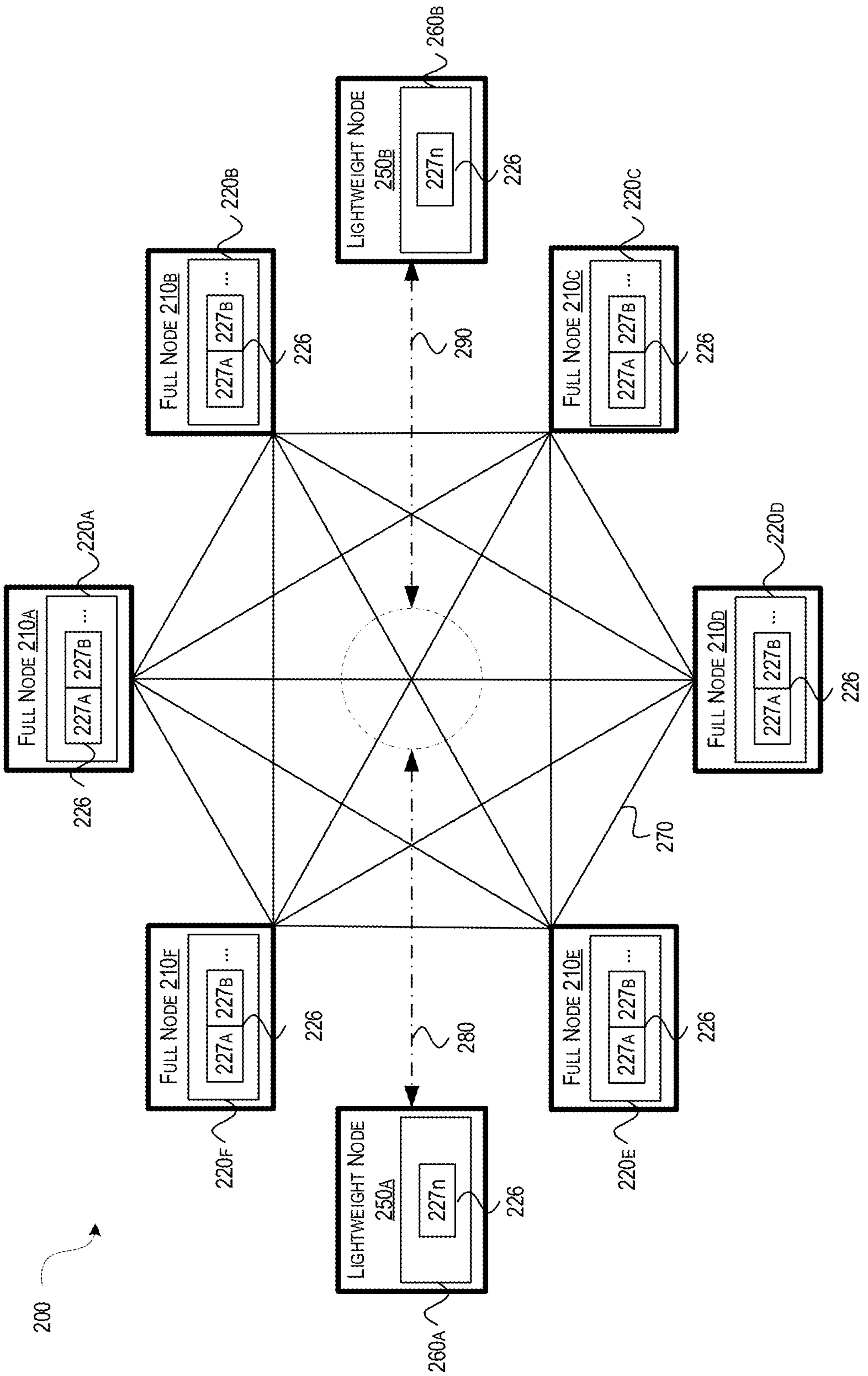
FIG. 2 shows an illustrative example of decentralized peer-to-peer (P2P) computer system that may be used in accordance with one or more illustrative aspects described herein.
Figure 3B:
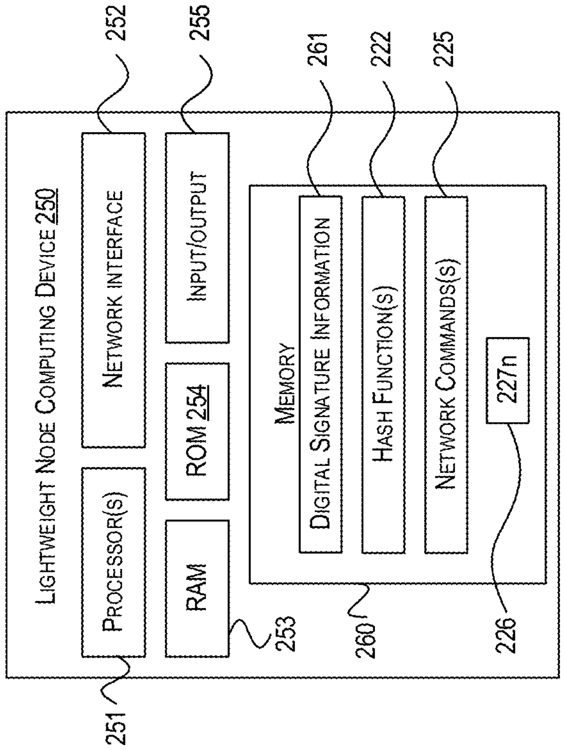
FIG. 3B shows an illustrative example of a lightweight node computing device that may be used in accordance with one or more illustrative aspects described herein.
Figure 3A:
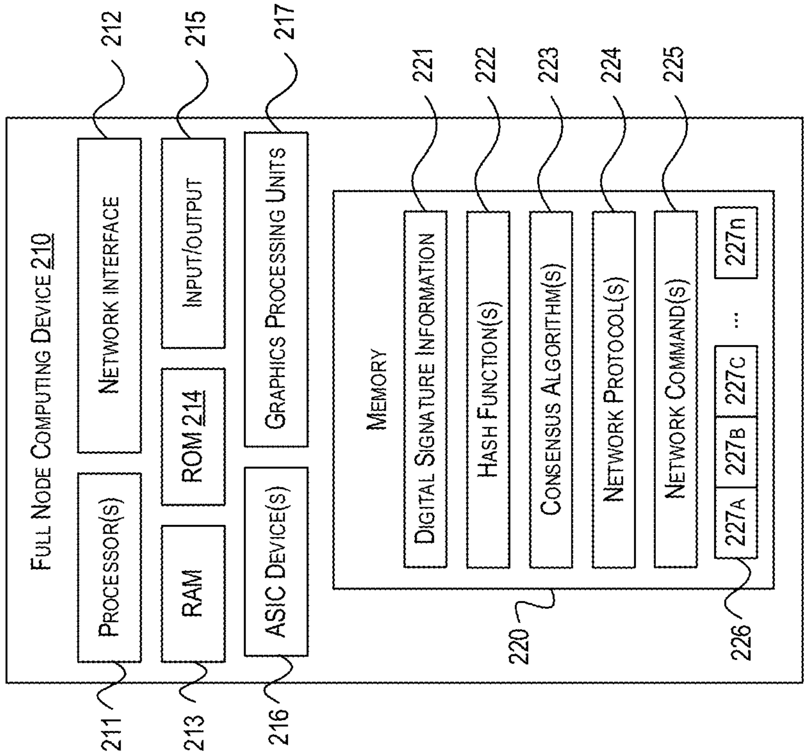
FIG. 3A shows an illustrative example of a full node computing device that may be used in accordance with one or more illustrative aspects described herein.
Figure 4:
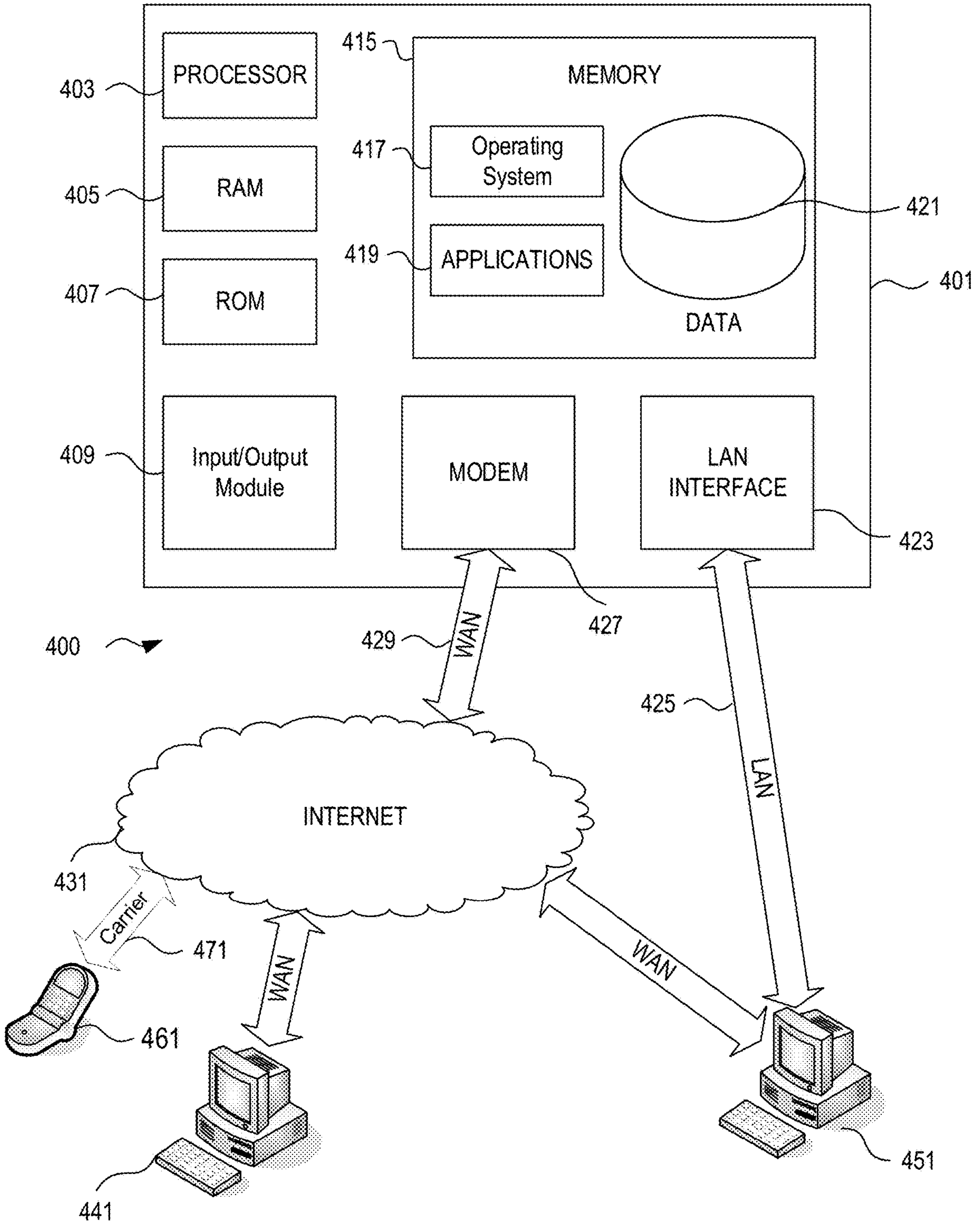
FIG. 4 shows an illustrative example of a suitable computing system environment that may be used in accordance with one or more illustrative aspects described herein.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As used throughout this disclosure, computer-executable "software and data" can include one or more: algorithms, applications, application program interfaces (APIs), attachments, big data, daemons, emails, encryptions, databases, datasets, drivers, data structures, file systems or distributed file systems, firmware, graphical user interfaces, images, instructions, machine learning (e.g., supervised, semi-supervised, reinforcement, and unsupervised), middleware, modules, objects, operating systems, processes, protocols, programs, scripts, tools, and utilities. The computer-executable software and data is on tangible, computer-readable memory (local, in network-attached storage, or remote), can be stored in volatile or non-volatile memory, and can operate autonomously, on-demand, on a schedule, and/or spontaneously.

"Computer machines" can include one or more: general-purpose or special-purpose network-accessible administrative computers, clusters, computing devices, computing platforms, desktop computers, distributed systems, enterprise computers, laptop or notebook computers, primary node computers, nodes, personal computers, portable electronic devices, servers, node computers, smart devices, tablets, and/or workstations, which have one or more microprocessors or executors for executing or accessing the computer-executable software and data. References to computer machines and names of devices within this definition are used interchangeably in this specification and are not considered limiting or exclusive to only a specific type of device. Instead, references in this disclosure to computer machines and the like are to be interpreted broadly as understood by skilled artisans. Further, as used in this specification, computer machines also include all hardware and components typically contained therein such as, for example, processors, executors, cores, volatile and non-volatile memories, communication interfaces, etc.

Computer "networks" can include one or more local area networks (LANs), wide area networks (WANs), the Internet, wireless networks, digital subscriber line (DSL) networks, frame relay networks, asynchronous transfer mode (ATM) networks, virtual private networks (VPN), or any combination of the same. Networks also include associated "network equipment" such as access points, ethernet adaptors (physical and wireless), firewalls, hubs, modems, routers, and/or switches located inside the network and/or on its periphery, and software executing on the foregoing.

The above-described examples and arrangements are merely some examples of arrangements in which the systems described herein may be used. Various other arrangements employing aspects described herein may be used without departing from the innovative concepts described.

Figure 6:
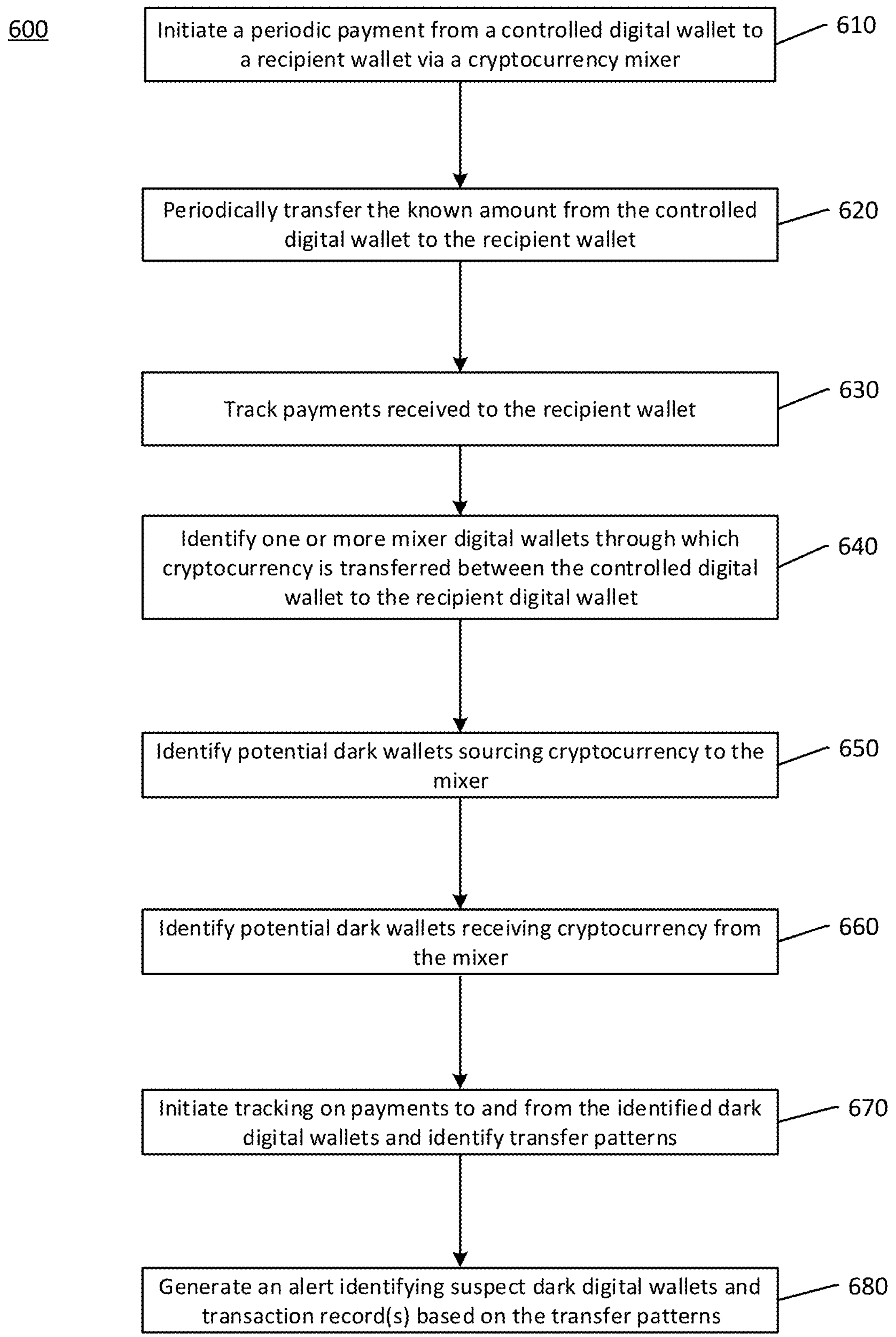
FIG. 6 show an illustrative process for cryptocurrency tracing, in accordance with one or more example arrangements.
Figure 7B:
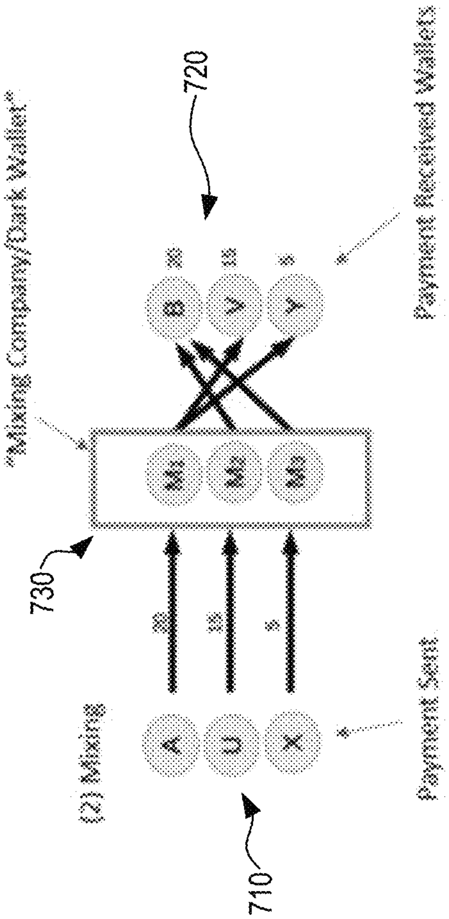
FIGS. 7A and 7B shows simplified block diagrams illustrating direct electronic transfers between digital wallets and using a mixer to obfuscate electronic transfers between the digital wallets, in accordance with one or more aspects described herein.
Figure 7A:
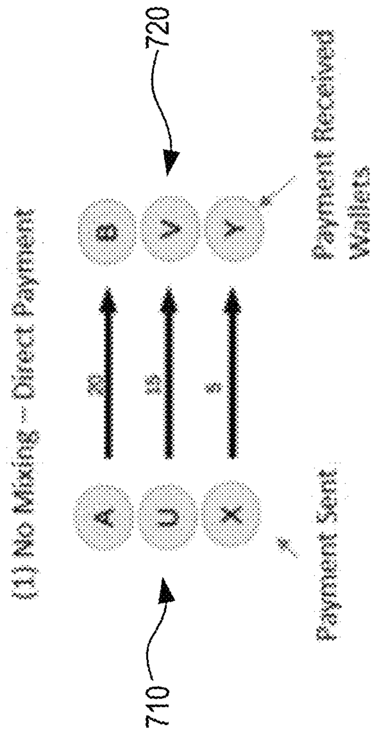

A simplified block diagram is show to represent direct payments between digital wallets is shown in FIG. 7A. Here, payments are directly sent from a first digital wallet (e.g., source wallets 710) to a corresponding recipient digital wallet (e.g., recipient wallets 720). For example, electronic transactions are shown from source wallet A to recipient wallet B, source wallet U to recipient wallet V, and from source wallet X to recipient wallet Y. FIG. 6B shows an illustrative obfuscation scheme utilized by mixers or tumblers to obfuscate transfers of funds between different accounts. Here, payments are indirectly sent from the first digital wallet (e.g., source wallets 710) to the corresponding recipient digital wallet (e.g., recipient wallets 720) via one or more intermediary wallets (e.g., mixer wallets 730). As can be seen, a first electronic transaction is desired to be obfuscated by the mixer wallets 730 (e.g., digital wallets $M_1$, $M_2$, and $M_3$) and utilize digital wallet A to transfer 20 crypto-units (e.g., bitcoins, doge coins, and the like) to the target digital wallet B. Similarly, the second and third electronic transactions are obfuscated through the mixer wallets 730 to facilitate transfer of 15 crypto-units from digital wallet U to the target digital wallet V and transfer of 5 crypto-units from digital wallet X to target digital wallet Y. As can be seen, the mixer utilizes multiple mixer wallets 730 to obfuscate the transfer of crypto-units by completing the transfer by utilizing partial transfer of the desired transfer amount (sometimes less a transaction fee) from one or more mixer digital wallets 730 to obfuscate the ledger trail from the source digital wallets 710 and the appropriate target wallet of the recipient digital wallets 720. In doing so, bad actors may hide their electronic transactions to obscure ill-gotten monies from illicit activities or otherwise hide monetary transfers. As such, a need has been recognized for systems and methods for tracing electronic transactions involving digital wallet transfers of one or more cryptocurrencies. The systems and methods may be configured to use a 'canary in a coal mine' approach to build a database on the financial flows of a crypto tumbler and/or mixer. The system may send test coins through the tumbler to document time, date, wallets, coin types, and/or names the tumbler is using at that particular point in time. In doing so, the system may allow authorized agencies to have a look back feature when trying to back into the specific accounts the illegal funds flowed through and provide next level tracking functionality. The systems and methods may provide ways to characterize the operators of the mixing services to build a file for different tumblers and/or attributes and vulnerabilities of each.

Figure 5A:
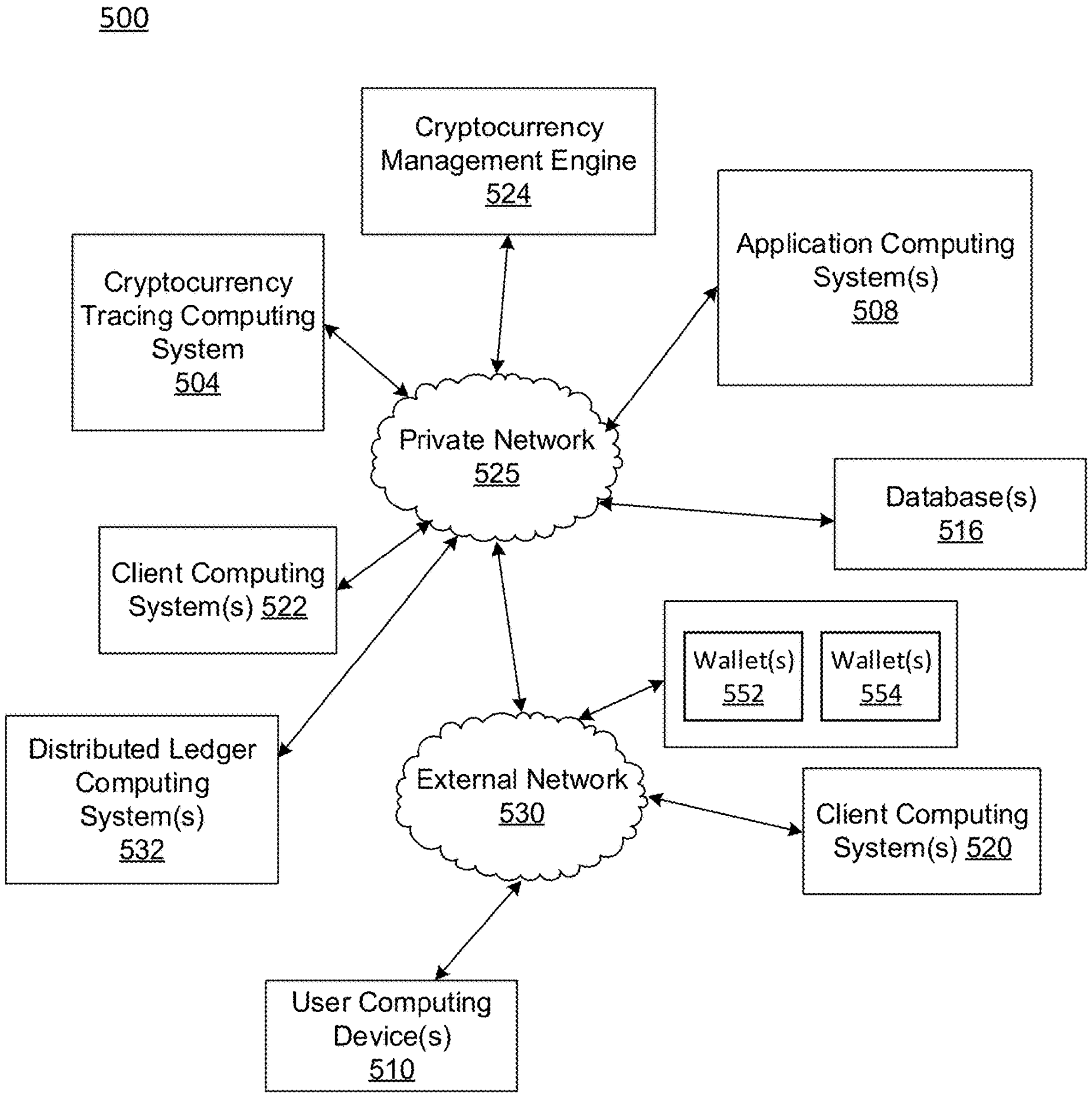
FIG. 5A shows an illustrative computing environment for cryptocurrency tracing, in accordance with one or more aspects described herein.

FIG. 5A shows an illustrative computing environment 500 for cryptocurrency tracing, in accordance with one or more arrangements. The computing environment 500 may comprise one or more devices (e.g., computer systems, communication devices, and the like). The computing environment 500 may comprise, for example, a cryptocurrency tracing computing system 504, one or more application computing systems 508, and/or one or more database(s) 516. In some cases, the computing environment 500 may include a cryptocurrency management engine 524. The one or more of the devices and/or systems, may be linked over a private network 525 associated with an enterprise organization (e.g., a financial institution, a business organization, an educational institution, a governmental organization and the like). The computing environment 500 may additionally comprise a client computing system 520 and one or more user devices 510 connected, via a public network 530, to the devices in the private network 525. The devices in the computing environment 500 may transmit/exchange/share information via hardware and/or software interfaces using one or more communication protocols. The communication protocols may be any wired communication protocol(s), wireless communication protocol(s), one or more protocols corresponding to one or more layers in the Open Systems Interconnection (OSI) model (e.g., local area network (LAN) protocol, an Institution of Electrical and Electronics Engineers (IEEE) 802.11 WIFI protocol, a 3*rd* Generation Partnership Project (3GPP) cellular protocol, a hypertext transfer protocol (HTTP), etc.). While FIG. 5A shows the cryptocurrency management engine 524 as being separate from the cryptocurrency tracing computing system 504, the cryptocurrency management engine 524 (and/or one or more digital wallets 552 and 554) may be incorporated within the cryptocurrency tracing computing system 504.

The cryptocurrency tracing computing system 504 may comprise one or more computing devices and/or other computer components (e.g., processors, memories, communication interfaces) configured to perform one or more functions as described herein. Further details associated with the architecture of the cryptocurrency tracing computing system 504 are described with reference to FIG. 5B.

The application computing systems 508 and/or the client computing systems 522 may comprise one or more computing devices and/or other computer components (e.g., processors, memories, communication interfaces). In addition, the application computing systems 508 and/or the client computing systems 522 may be configured to host, execute, and/or otherwise provide one or more enterprise applications. In some cases, the application computing systems 508 may host one or more services configured facilitate operations requested through one or more API calls, such as data retrieval and/or initiating processing of specified functionality. In some cases, the client computing systems 522 may be configured to communicate with one or more of the application computing systems 508 such as via direct communications and/or API function calls and the services. In an arrangement where the private network 525 is associated with a financial institution (e.g., a bank), the application computing systems 508 may be configured, for example, to host, execute, and/or otherwise provide one or more transaction processing programs, such as an online banking application, fund transfer applications, and/or other programs associated with the financial institution. The application computing systems 508 and/or the client computing systems 522 may comprise various servers and/or databases that store and/or otherwise maintain account information, such as financial account information including account balances, transaction history, account owner information, and/or other information. In addition, the application computing systems 508 and/or the client computing systems 522 may process and/or otherwise execute transactions on specific accounts based on commands and/or other information received from other computer systems comprising the computing environment 500. In some cases, one or more of the application computing systems 508 and/or the client computing systems 522 may be configured, for example, to host, execute, and/or otherwise provide one or more transaction processing programs, such as electronic fund transfer applications, online loan processing applications, and/or other programs associated with the financial institution.

The application computing systems 508 may be one or more host devices (e.g., a workstation, a server, and the like) or mobile computing devices (e.g., smartphone, tablet). In addition, an application computing systems 508 may be linked to and/or operated by a specific enterprise user (who may, for example, be an employee or other affiliate of the enterprise organization) who may have administrative privileges to perform various operations within the private network 525. In some cases, the application computing systems 508 may be capable of performing one or more layers of user identification based on one or more different user verification technologies including, but not limited to, password protection, pass phrase identification, biometric identification, voice recognition, facial recognition and/or the like. In some cases, a first level of user identification may be used, for example, for logging into an application or a web server and a second level of user identification may be used to enable certain activities and/or activate certain access rights.

The client computing systems 520 may comprise one or more computing devices and/or other computer components (e.g., processors, memories, communication interfaces). The client computing systems 520 may be configured, for example, to host, execute, and/or otherwise provide one or more transaction processing programs, such as goods ordering applications, electronic fund transfer applications, online loan processing applications, and/or other programs associated with providing a product or service to a user. With reference to the example where the client computing systems 520 is for processing an electronic exchange of goods and/or services. The client computing systems 520 may be associated with a specific goods purchasing activity, such as purchasing a vehicle, transferring title of real estate may perform communicate with one or more other platforms within the client computing systems 520. In some cases, the client computing systems 520 may integrate API calls to request data, initiate functionality, or otherwise communicate with the one or more application computing systems 508, such as via the services. For example, the services may be configured to facilitate data communications (e.g., data gathering functions, data writing functions, and the like) between the client computing systems 520 and the one or more application computing systems 508. In some cases, the client computing systems 520 may include legal and/or governmental computing systems used to report and/or manage instances of suspected improper monetary transfers. For example, under a governmental regulation, the enterprise organization may be required to submit a report when suspected illicit monetary transfers are identified. Such reports may include electronic transfer records, identifiers of source digital wallets, recipient digital wallets, mixer digital wallets, transfer paths between the source digital wallet, one or more intermediary digital wallets, and the recipient digital wallets, dates of the electronic transactions, amounts associated with the electronic transactions, and/or other like information.

The user device(s) 510 may be computing devices (e.g., desktop computers, laptop computers) or mobile computing device (e.g., smartphones, tablets) connected to the network 525. The user device(s) 510 may be configured to enable the user to access the various functionalities provided by the devices, applications, and/or systems in the network 525.

The database(s) 516 may comprise one or more computer-readable memories storing information that may be used by the cryptocurrency tracing computing system 504. For example, the database(s) 516 may store identifiers of affiliated digital wallets (e.g., a source digital wallet, a recipient digital wallet), tracing records of a plurality of electronic transactions between the affiliated digital wallets, identifiers of mixer digital wallets, identifiers of suspect illicit sourcing digital wallets, identifiers of suspect illicit recipient digital wallets, and the like. In an arrangement, the database(s) 516 may be used for other purposes as described herein. In some cases, the client computing system 520 (e.g., a governmental agency computing system) may write data or read data to the database(s) 516 via the services.

In one or more arrangements, the cryptocurrency tracing computing system 504, the cryptocurrency management engine 524, the application computing systems 508, the client computing system 522, the client computing system 520, the user devices 510, and/or the other devices/systems in the computing environment 500 may be any type of computing device capable of receiving input via a user interface, and communicating the received input to one or more other computing devices in the computing environment 500. For example, the cryptocurrency tracing computing system 504, the cryptocurrency management engine 524, the application computing systems 508, the client computing system 522, the client computing system 520, the user devices 510, and/or the other devices/systems in the computing environment 500 may, in some instances, be and/or include server computers, desktop computers, laptop computers, tablet computers, smart phones, wearable devices, or the like that may comprised of one or more processors, memories, communication interfaces, storage devices, and/or other components. Any and/or all of the cryptocurrency tracing computing system 504, the cryptocurrency management engine 524, the application computing systems 508, the client computing system 522, the client computing system 520, the user devices 510, and/or the other devices/systems in the computing environment 500 may, in some instances, be and/or comprise special-purpose computing devices configured to perform specific functions.

Figure 5B:
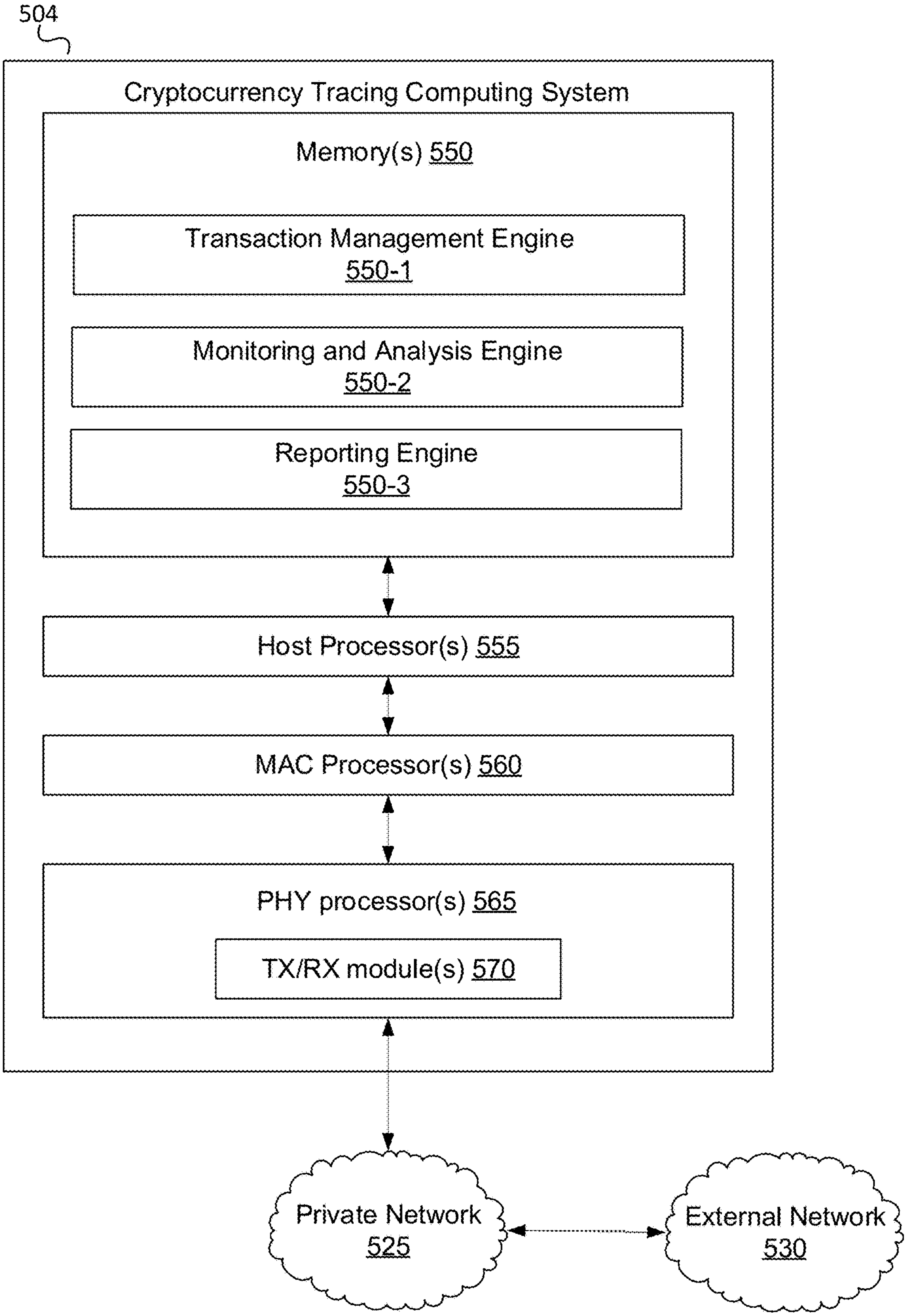
FIG. 5B shows an illustrative computing platform enabled for cryptocurrency tracing, in accordance with one or more aspects described herein.

FIG. 5B shows an illustrative cryptocurrency tracing computing system 504 in accordance with one or more examples described herein. The cryptocurrency tracing computing system 504 may be a stand-alone device and/or may at least be partial integrated with the cryptocurrency management engine 524 and may comprise one or more of host processor(s) 555, medium access control (MAC) processor(s) 560, physical layer (PHY) processor(s) 565, transmit/receive (TX/RX) module(s) 570, memory 550, and/or the like. One or more data buses may interconnect host processor(s) 555, MAC processor(s) 560, PHY processor(s) 565, and/or Tx/Rx module(s) 570, and/or memory 550. The cryptocurrency tracing computing system 504 may be implemented using one or more integrated circuits (ICs), software, or a combination thereof, configured to operate as discussed below. The host processor(s) 555, the MAC processor(s) 560, and the PHY processor(s) 565 may be implemented, at least partially, on a single IC or multiple ICs. The memory 550 may be any memory such as a random-access memory (RAM), a read-only memory (ROM), a flash memory, or any other electronically readable memory, or the like.

Messages transmitted from and received at devices in the computing environment 500 may be encoded in one or more MAC data units and/or PHY data units. The MAC processor(s) 560 and/or the PHY processor(s) 565 of the cryptocurrency tracing computing system 504 may be configured to generate data units, and process received data units, that conform to any suitable wired and/or wireless communication protocol. For example, the MAC processor(s) 560 may be configured to implement MAC layer functions, and the PHY processor(s) 565 may be configured to implement PHY layer functions corresponding to the communication protocol. The MAC processor(s) 560 may, for example, generate MAC data units (e.g., MAC protocol data units (MPDUs)), and forward the MAC data units to the PHY processor(s) 565. The PHY processor(s) 565 may, for example, generate PHY data units (e.g., PHY protocol data units (PPDUs)) based on the MAC data units. The generated PHY data units may be transmitted via the TX/RX module(s) 570 over the private network 525. Similarly, the PHY processor(s) 565 may receive PHY data units from the TX/RX module(s) 565, extract MAC data units encapsulated within the PHY data units, and forward the extracted MAC data units to the MAC processor(s). The MAC processor(s) 560 may then process the MAC data units as forwarded by the PHY processor(s) 565.

One or more processors (e.g., the host processor(s) 555, the MAC processor(s) 560, the PHY processor(s) 565, and/or the like) of the cryptocurrency tracing computing system 504 may be configured to execute machine readable instructions stored in memory 550. The memory 550 may comprise (i) one or more program modules/engines having instructions that when executed by the one or more processors cause the cryptocurrency tracing computing system 504 to perform one or more functions described herein and/or (ii) one or more databases that may store and/or otherwise maintain information which may be used by the one or more program modules/engines and/or the one or more processors. The one or more program modules/engines and/or databases may be stored by and/or maintained in different memory units of the cryptocurrency tracing computing system 504 and/or by different computing devices that may form and/or otherwise make up the cryptocurrency tracing computing system 504. For example, the memory 550 may have, store, and/or comprise a transaction management engine 550-1, a monitoring and analysis engine 550-2, a reporting engine 550-3, and/or the like. The transaction management engine 550-1 may have instructions that direct and/or cause the cryptocurrency tracing computing system 504 to perform one or more operations associated with creating and/or facilitating electronic transfers between a source tracing digital wallet and a recipient tracing digital wallet and a frequency, amount, and/or cryptocurrency type of a series of electronic transactions, and the like. The monitoring and analysis engine 550-2 may process instructions that may cause the cryptocurrency tracing computing system 504 to perform monitoring and/or analysis of the cryptocurrency transactions initiated by the transaction management engine 550-1, identify mixer transaction patterns based on those transactions, such as via pattern analysis using a continuously trained machine learning model and/or other analysis method. The reporting engine 550-3 may have instructions that direct and/or cause the cryptocurrency tracing computing system 504 to perform one or more operations associated with generating alerts, providing interactive user interfaces that allow law enforcement personal to initiate automated law enforcement actions such as initiating a lockdown of digital wallets suspected of illicit activities, and the like.

While FIG. 5A illustrates the cryptocurrency tracing computing system 504, the cryptocurrency management engine 524 and/or the application computing systems 508, as being separate elements connected in the private network 525, in one or more other arrangements, functions of one or more of the above may be integrated in a single device/network of devices. For example, elements in the cryptocurrency tracing computing system 504 (e.g., host processor(s) 555, memory(s) 550, MAC processor(s) 560, PHY processor(s) 565, TX/RX module(s) 570, and/or one or more program/modules stored in memory(s) 550) may share hardware and software elements with and corresponding to, for example, the cryptocurrency management engine 524, and/or the application computing systems 508.

Cryptocurrencies are often implemented on an anonymizing digital ledger platform (e.g., blockchain, holochain, and the like), such as the distributed ledger computing systems 532. While digital wallet ownership and/or electronic transactions may be anonymized, the digital leger platforms store information that provides transaction verification that allows the cryptocurrency universe to exist. Due to the difficulty in tracing cryptocurrency transactions, nefarious and/or malicious actors use then to mask movements of ill-gotten gains. However, this same immutable digital ledger information may be leveraged by the cryptocurrency tracing computing system 504 to trace cryptocurrency transaction through complex patterns of electronic transactions designed to obscure monetary movements of illicit gains.

For direct cryptocurrency transactions between digital wallets, tracing the transactions may be recorded through the publicly available logs integral to an associated digital ledger platforms (e.g., the distributed ledger computing systems 532). For example, bitcoin transactions may be traced via the associated blockchain-based ledgers. Because of potential opportunities to profit from illicit activities, and in an attempt to hide monetary transfers associated with those illicit activities, crypto-mixers have been formed to mask sending of a specified amount of money between a monetary source (e.g., a digital wallet) and a recipient. For example, the crypto-mixer (or "tumbler") may receive a request to obscure a transfer of funds, from a source digital wallet (e.g., digital wallet 552) to a recipient digital wallet (e.g., digital wallet 554). The crypto-mixer (e.g., a user computing device or one or more of the user devices 510 configured to obscure electronic transactions between digital wallets) may utilize one or more intermediary digital wallets to facilitate the transfer. In some cases, the crypto-mixer may "layer" the intermediary digital wallets and/or may utilize different transfer patterns when attempting to obscure transfer of the illicit funds. The recipient digital wallet receives an expected amount of funds, but from one or more of a plurality of mixer digital wallets as shown in FIG. 7B.

Information obtained via the digital ledger computing system regarding suspect digital wallets may be augmented via additional data sources storing information concerning electronic transactions associated with digital wallets, such as an enterprise organization database (e.g., databases 516) (e.g., for products and/or services), vendor electronic transaction information, address information, governmental records information and/or the like. In some cases, the mixers may layer transfers via multiple layers of mixer wallets, and/or may exchange portions of the funds through different currencies (crypto currencies, country-backed currencies, precious metals, securities, and/or the like). The monitoring and analysis engine 550-3 may monitor the periodic electronic transaction continually sent from the sending digital wallet to the recipient digital wallet via the mixer to identify transfer patterns to and from the mixer's digital wallets such as transfer patters from source digital wallets recipient digital wallets, mixer digital wallets, and/or the like. In some cases, the monitoring and analysis engine 550-3 may incorporate a machine learning engine with a model trained to identify cryptocurrency transfer patterns to and/or from the mixer digital wallets. In some cases, the initial training of the machine learning model may be performed based on a historical data set, a simulated data set, and/or a combination. The machine learning model may be trained periodically (e.g., daily, weekly, monthly, quarterly, yearly) based on identified cryptocurrency transfer patterns and/or suspect and valid electronic transfers between digital wallets that occurred within that or other previous time periods. In some case, the machine learning model may be trained continuously based on currently monitored electronic transfers between digital wallets and/or identified cryptocurrency transfer patterns and/or feedback received via a user interface provided by the reporting engine 550-3.

The reporting engine 550-3 may generate a user interface screen that provides a visual representation of monetary movements, with or without a drill-down capability to see individual details as well as identifying similarities between patterns of illicit monetary movements. In some cases, the user interface screen may include one or more inputs that allow remote authorization to initiate automatic freezing of access to and/or from suspect digital wallets of senders, mixers, or recipients of the suspected illicit fund transfers.

In general, the cryptocurrency tracing computing system 504 may be configured to trace cryptocurrency transfers through one or more mixers such as by injecting a stream of cryptocurrency into the mixer to identify digital wallets used to transfer amounts of cryptocurrency through the mixer, identify other digital wallets transferring cryptocurrency into the mixer accounts and/or receiving transfers from mixer digital wallets. The cryptocurrency tracing computing system 504 may allow authorized systems (e.g., law enforcement computing systems, organizational computing systems, governmental computing systems, enterprise computing systems, and the like) to trace cryptocurrency transactions facilitated by mixing companies.

Figure 8:
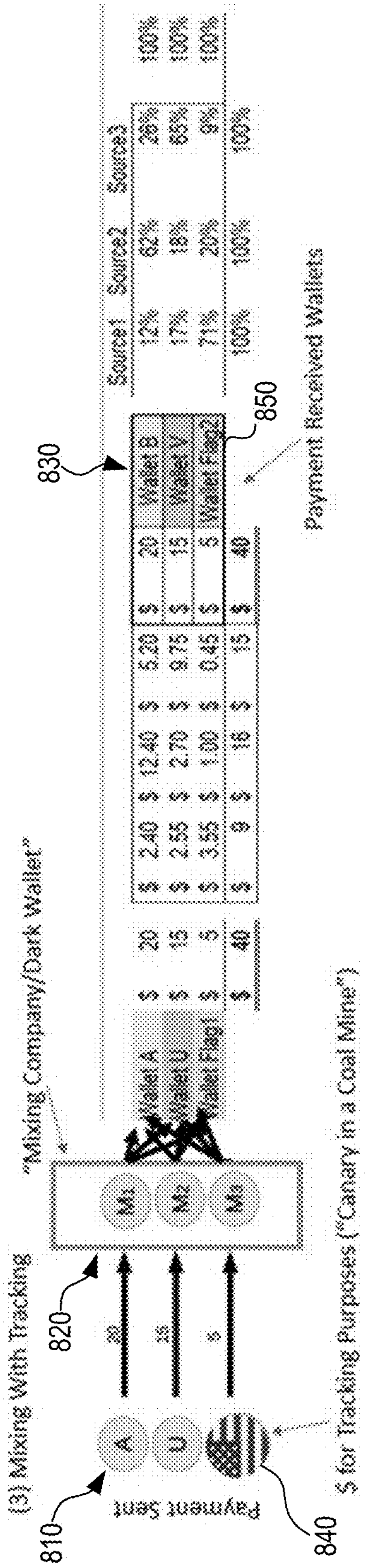
FIG. 8 shows an illustrative example of cryptocurrency tracing in accordance with one or more aspects described herein.

In some cases, the cryptocurrency tracing computing system 504, via the transaction management engine 550-1 may initiate one of a plurality of electronic transfers from an associated digital wallet through a mixer organization. The monitoring and analysis engine 550-2 may associate time and date information with each electronic transfer. When identifying a potential malicious actor, the monitoring and analysis engine 550-2 may identify other electronic transaction entering the mixer with the same time and date stamp, or within a predefined time window (e.g., 10 seconds, 30 seconds, 1 minute) that may be mixed with the electronic transaction sent from the sending digital wallet, so that the various mixer digital wallets may be identified. Additionally, when the mixer digital wallets are identified, potential illicit actor's digital wallets may be identified on a sending side and/or a receiving side. By tracking time and date stamps for transactions entering and leaving the mixer digital wallets, the monitoring and analysis engine 550-2 may be able to identify whether a malicious actor sent their money at a time (e.g., 12:10 PM), and at the same time, whether the mixer was mixing electronic transfers via a plurality of digital wallets. As such, the monitoring and analysis engine 550-2 can track the output down to the coin. To augment the tracing information, the monitoring and analysis engine 550-2 may utilize a “beacon” or “talk-back” approach to effectively know where cryptocurrency injected into the system ultimately landed. Using these features, the monitoring and analysis engine 550-2 may analyze suspected mixing entities and identify sources and/or targets that may have been suspected or had been previously unknown. In such cases, the monitoring and analysis engine 550-2 may schedule periodic electronic transactions (e.g., nearly continuous) of a small amount of cryptocurrency (e.g., fractional cryptocurrency units such as 0.001 units) such that the supplying digital wallet has a fresh supply to send to a mixer organization. Often, results of these transactions may not result in real-time identification of malicious activities involving illicit monetary movements, but over time the monitoring and analysis engine 550-2 may identify a pattern to allow automatic freezing of digital accounts and may provide law enforcement with evidence to build a case. In some cases, the monitoring and analysis engine 550-2 may analyze historical records stored in the distributed ledger computing systems 532 identify patterns of malicious activity based on the time and date stamp of recorded electronic transactions via the mixer digital wallets with respect to time and date stamps of each transaction of the series of periodic electronic transactions from the source digital wallet 552 to the recipient digital wallet 554 via the mixer digital wallets. The patterns of malicious activity may include electronic transfers from suspect digital wallets to suspect recipient digital wallets via the mixer digital wallets as shown in FIG. 8.

In some cases, the monitoring and analysis engine 550-2 may utilize a multi-part process including a near constant (e.g., periodic), injection comprising low-value electronic transfers from a source digital wallet to a destination digital wallet and utilizing a mixer computing system suspected of illicit transfers of cryptocurrency. The monitoring and analysis engine 550-2 may identify a pattern of electronic transfers from the source digital wallet to the recipient digital wallet via the mixer digital wallets and may further actively monitor the electronic transfers by transferring larger sums to specifically identify times and dates associated with these injections of larger amounts to track the flow through the mixing system, to identify more suspect illicit digital wallets, both sourcing and receiving illicit funds.

In general, cryptocurrency use has increase in the past few years. As such, different cryptocurrencies have been created and/or have been used around the world. Additionally, thousands of cryptocurrencies have been created—over 20,000—with much less (e.g., about 10 thousand, about 11 thousand) being active in some form or another. While many cryptocurrencies exist, typically mixers may select a subset (e.g., 200 cryptocurrencies) of the total to use, such as the most capitalized, used, traded or the like. For example, the mixing organizations may use the ones that are available in high dollars and/or in high circulation. As such, the mixing companies may attempt to select particular cryptocurrencies based on an exchange rate at a given point in time (e.g., using the ones that have the most favorable exchange rates). As such, the monitoring and analysis engine 550-2 may include historical records of cryptocurrency exchange rates and other trading information (e.g., trading volume, availability, current popularity, and the like) when identifying trade patterns. For example, a particular suspect transaction may select a starting cryptocurrency and/or a target cryptocurrency, where the mixing organization may utilize different mixing digital wallets to increase their chances of making additional money on the exchange (e.g., by using one or more intermediary cryptocurrencies) when obscuring the desired transaction. The monitoring and analysis engine 550-2 may also identify patterns in the cryptocurrency ecosystem to identify whether mixing is being done with particular cryptocurrencies (e.g., a highest volume cryptocurrency, a cryptocurrency with increasing popularity due, and/or the like).

In an illustrative example, some cryptocurrencies such as bitcoin has enough volume so that trades do not exhibit large ask spread, so exchanges in bitcoin are easy. However, on another day, bitcoin trades may be less favorable, so the mixing organization adjusts their algorithm such that a percentage of output using Bitcoin is changed to trade more in Doge coins or other cryptocurrencies. The monitoring and analysis engine 550-2 may identify a mixing pattern being used, such as whether the mixer is distributing the transferred currency as 27%, Bitcoin, 13%, Doge coin, and the like. The low dollar, high volume transaction chains by the tracing source wallet sending through the mixing is held to be constant, so that the monitoring and analysis engine 550-2 can recognize patterns in the sending path based on time of day, exchange rates, trading volumes, and the like. While the mixing organization may use fixed patterns (e.g., 27% of bitcoins at 6 pm), they may also vary that percentage based on multiple parameters, from which patterns can be identified. The monitoring and analysis engine 550-2 may also track cryptocurrency values on various exchanges and identify a formula or algorithm that may be used maximize value while transferring through the mixing digital wallets. As such, the monitoring and analysis engine 550-2 may identify exchanges used by the mixers to see whether volume discounts, and/or currency types, and/or dollar value types to obtain a favorable exchange or reduction in transaction fees.

The monitoring and analysis engine 550-2 may also identify digital wallets that receive transfers from the sending digital wallet and source transfers to the receiving digital wallet, so over time, the monitoring and analysis engine 550-2 may identify all mixing digital wallets used as part of the transfer process. Using the mixing digital wallet identifiers, the sending and/or receiving digital wallets utilizing the mixing services can also be identified. As such, the monitoring and analysis engine 550-2 can build patterns of transfers that can be used to build a characteristic data set associated with one or more malicious actor networks attempting to obscure funds transfers. In some cases, the mixers may become suspicious of constant injection of fund streams. As such, the transaction management engine 550-1 may use multiple sourcing digital wallets to send funds to the mixing organizations and multiple receiving digital wallets to receive transfers from the mixing organizations. In some cases, the transaction management engine 550-1 may vary the amount of funds sent in each transaction over time to obfuscate the monitoring activities. For example, the transaction management engine 550-1 may utilize continuous transactions streams of low values, but may vary the source and/or targets, cryptocurrencies, transaction amounts of the stream and/or individual transactions within the stream, and the like. Additionally, the transaction management engine 550-1 may vary a number of sending wallets, a number of receiving wallets, vary sending times, sending dates, volume of transaction (e.g., rate of transactions within the stream), cryptocurrency types, and the like that are sent through the mixing organization.

The cryptocurrency tracing computing system 504 is cryptocurrency (and digital ledger platform) agnostic and is not tied to any particular cryptocurrency (e.g., Bitcoin) and applies to all cryptocurrencies that exist today as well as similar cryptocurrencies created in the future as transacted via digital wallets. The cryptocurrency tracing computing system 504 uses public or at least publicly accessible digital wallets that can be monitored via an accessible ledger system. In some cases, the monitored data may be augmented with certificates and/or digital wallet information, fees charged by the mixing organizations, exchange rates, trading volume information and/or other trading platform data.

FIG. 6 show an illustrative process for cryptocurrency tracing, in accordance with one or more aspects described herein. At 610, the transaction management engine 550-1 may initiate a periodic payment from a controlled digital wallet to a recipient wallet via a cryptocurrency mixer. At 620, the transaction management engine 550-1 may periodically transfer the known amount from the controlled digital wallet via the mixing organization to the recipient wallet. At 630, the monitoring and analysis engine 550-2 may track the payments received at the recipient digital wallet and identify one or more mixer digital wallets through which cryptocurrency is transferred between the controlled digital wallet to the recipient digital wallet at 640. The monitoring and analysis engine 550-2 may identify potential dark wallets sourcing cryptocurrency to the mixer at 650 and potential dark wallets receiving cryptocurrency from the mixer at 660. At 670, the monitoring and analysis engine 550-2 may initiate tracking on payments to and from the identified dark digital wallets and identify transfer patterns, and other patterns via time and data stamps of transaction of a transaction stream and/or from digital ledger information at 670. Based on the transfer patterns, the reporting engine 550-3 may generate an alert identifying suspect dark digital wallets and transaction record(s) and/or may initiate freezing of suspect dark digital wallets at 680.

FIG. 8 shows an illustrative example of cryptocurrency tracing in accordance with one or more aspects described herein. In some cases, multiple sending digital wallets 810 may send cryptocurrency to a mixing organization that utilizes a plurality of mixing digital wallets 820 to obfuscate the sending of amounts of cryptocurrency to a plurality of receiving digital wallets 830. The cryptocurrency tracing computing system 504 may utilize one or more sending digital wallets (e.g., sending wallet 840) and one or more receiving digital wallets (e.g., receiving wallet 850) for tracing cryptocurrency sent via the mixing digital wallets 820. Based on multiple transactions, such as a periodic sequence of transactions, the mixing digital wallets 820 (e.g., $M_1$, $M_2$, $M_3$) may be identified that are receiving funds from the sending wallet 840 and/or sending funds to the receiving wallet 850. Based on the identified mixing digital wallets 820, the cryptocurrency tracing computing system 504 may identify one or more of the sending digital wallets 810 and/or the receiving digital wallets 830. Once identified, the cryptocurrency tracing computing system 504 may continue to trace currency transfers through the mixing organization to identify transfer patterns (e.g., usage percentages) for transfers to and from the mixing digital wallets 820, to report suspect transfers, patterns, digital wallets, and/or to automatically freeze suspect digital wallets (or initiate freezing suspect digital wallets).

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

The invention claimed is:

1. A cryptocurrency tracing device comprising:

a processor:

memory storing instructions that, when executed by the processor, cause the cryptocurrency tracing device to:

train, by a machine learning engine, a machine learning model based on historical electronic transaction information, to identify transfer patterns between digital wallets;

initiate a first periodic series of electronic transactions from a sending digital wallet to a receiving digital wallet via a cryptocurrency mixing service, wherein each electronic transaction comprises a fractional cryptocurrency amount;

monitor, by a monitoring and analysis engine, a plurality of electronic transactions between a plurality of digital wallets;

identify, based on the first periodic series of electronic transactions by the machine learning engine, a plurality of mixing digital wallets associated with the cryptocurrency mixing service;

trace, based on the identified plurality of mixing digital wallets, a plurality of obscured transactions to and from the plurality of mixing digital wallets;

identify, by the machine learning engine based on a traced plurality of transactions, one or more illicit digital wallets associated with obscured payment transactions through the plurality of mixing digital wallets;

continually train, by the machine learning engine, the machine learning model based on the traced plurality of obscured transactions to and from the plurality of mixing digital wallets; and freeze, automatically based on identification of a suspect transfer pattern between a first suspect digital wallet and at least a first mixing digital wallet of the plurality of mixing digital wallets, the first suspect digital wallet, based on an identification of a pattern of obscured payment transactions being representative of illicit activities.

2. The cryptocurrency tracing device of claim 1, wherein the instructions cause the cryptocurrency tracing device to:

cause display, on a user device, of a user interface screen identifying transfer patterns of cryptocurrency to and from the mixing digital wallets; and receive, via a network, a command to freeze one or more suspect digital wallets.

3. A system comprising:

an application computing system comprising a sending digital wallet and a receiving digital wallet;

a cryptocurrency tracing system comprising:

a processor:

memory storing instructions that, when executed by the processor, cause the cryptocurrency tracing system to:

train, by a machine learning engine, a machine learning model based on historical electronic transaction information, to identify transfer patterns between digital wallets;

initiate a first periodic series of electronic transactions from the sending digital wallet to the receiving digital wallet via a cryptocurrency mixing service, wherein each electronic transaction comprises a fractional cryptocurrency amount;

monitor, by a monitoring and analysis engine, a plurality of electronic transactions between a plurality of digital wallets;

identify, based on the first periodic series of electronic transactions, a plurality of mixing digital wallets associated with the cryptocurrency mixing service;

trace, based on the identified plurality of mixing digital wallets, a plurality of obscured transactions to and from the plurality of mixing digital wallets;

identify, based on a traced plurality of transactions, one or more illicit digital wallets associated with obscured payment transactions through the plurality of mixing digital wallets;

continually train, by the machine learning engine, the machine learning model based on the traced plurality of obscured transactions to and from the plurality of mixing digital wallets; and freeze, automatically, one or more suspect digital wallets, based on an identification of a suspect transfer pattern between a first suspect digital wallet and at least a first mixing digital walled of the plurality of mixing digital wallets, the first suspect digital wallet based on a pattern of obscured payment transactions being representative of illicit activities.

4. The system of claim 3, wherein the instructions cause the cryptocurrency tracing system to send, based on identifying one or more suspect digital wallets sending cryptocurrency to the plurality of mixing digital wallets, a second series of electronic transactions to the plurality of mixing digital wallets.

5. The system of claim 3, wherein the instructions cause the cryptocurrency tracing system to cause display, on a user device, of a user interface screen identifying transfer patterns of cryptocurrency to and from the plurality of mixing digital wallets.

6. The system of claim 4, wherein the first periodic series of electronic transactions comprises a first amount of cryptocurrency and the second series of electronic transactions comprises a second amount of cryptocurrency.

7. The system of claim 4, wherein the first periodic series of electronic transactions comprises a first cryptocurrency and the second series of electronic transactions comprises a second cryptocurrency.

8. The system of claim 6, wherein the first amount of cryptocurrency is smaller than the second amount of cryptocurrency.

9. The system of claim 6, wherein the first amount of cryptocurrency comprises a fractional amount of cryptocurrency.

10. The system of claim 5, wherein a user interface screen identifies suspect digital wallets that participate in electronic transactions with the plurality of mixing digital wallets.

11. The system of claim 5, wherein the instructions cause the cryptocurrency tracing system to receive, via a network, a command to freeze one or more suspect digital wallets.

12. A method comprising:

training, by a machine learning engine, a machine learning model based on historical electronic transaction information, to identify transfer patterns between digital wallets;

initiating, by a cryptocurrency tracing system, a first periodic series of electronic transactions from a sending digital wallet to a receiving digital wallet via a cryptocurrency mixing service, wherein each electronic transaction comprises a fractional cryptocurrency amount;

monitoring, by a monitoring and analysis engine, a plurality of electronic transactions between a plurality of digital wallets;

identifying, based on the first periodic series of electronic transactions, a plurality of mixing digital wallets associated with the cryptocurrency mixing service;

tracing, based on the identified plurality of mixing digital wallets, a plurality of obscured transactions to and from the plurality of mixing digital wallets;

identifying, based on a traced plurality of transactions, one or more suspect digital wallets associated with obscured payment transactions through the plurality of mixing digital wallets;

training, continually by the machine learning engine, the machine learning model based on the traced plurality of obscured transactions to and from the plurality of mixing digital wallets; and freezing, automatically and by an application computing system based on identification of a suspect transfer pattern between a first suspect digital wallet and at least a first mixing digital wallet of the plurality of mixing digital wallets, the first suspect digital wallet, based on an identification of a pattern of obscured payment transactions being representative of illicit activities.

13. The method of claim 12, further comprises sending, based on identifying one or more suspect digital wallets sending cryptocurrency to the mixing digital wallets, a second series of electronic transactions to the plurality of mixing digital wallets.

14. The method of claim 12, further comprising display, on a user device, a user interface screen identifying transfer patterns of cryptocurrency to and from the plurality of mixing digital wallets.

15. The method of claim 13, wherein the first periodic series of electronic transactions comprises a first amount of cryptocurrency and the second series of electronic transactions comprises a second amount of cryptocurrency.

16. The method of claim 13, wherein the first periodic series of electronic transactions comprises a first cryptocurrency and the second series of electronic transactions comprises a second cryptocurrency.

17. The method of claim 15, wherein the first amount of cryptocurrency is smaller than the second amount of cryptocurrency.

18. The method of claim 15, wherein the first amount of cryptocurrency comprises a fractional amount of cryptocurrency.

19. The method of claim 14, wherein the user interface screen identifies suspect digital wallets that participate in electronic transactions with the plurality of mixing digital wallets.

20. The method of claim 14, further comprising receiving, via a network, a command to freeze one or more suspect digital wallets.

* * * * *